United States Patent
Aranguren et al.

[11] Patent Number: 5,553,071
[45] Date of Patent: Sep. 3, 1996

[54] COMMUNICATION SYSTEM TOPOLOGY PROVIDING DYNAMIC ALLOCATION OF B-CHANNELS

[75] Inventors: William L. Aranguren, Ocean Township, Monmouth County; Albert D. Baker, Lincroft, both of N.J.

[73] Assignee: Lucent Technologies Inc., Murray Hill, N.J.

[21] Appl. No.: 323,184

[22] Filed: Oct. 14, 1994

[51] Int. Cl.$^6$ .................................................. H04L 12/413
[52] U.S. Cl. ...................... 370/85.3; 370/85.7; 370/110.1
[58] Field of Search ................................... 370/58.3, 85.1, 370/85.2, 85.3, 85.7, 85.8, 85.11, 85.9, 95.1, 95.2, 110.1; 340/825.03, 825.04

[56] References Cited

U.S. PATENT DOCUMENTS

| | | | |
|---|---|---|---|
| 5,249,183 | 9/1993 | Wong et al. | 370/85.3 |
| 5,305,318 | 4/1994 | Ozeki et al. | 370/85.7 |
| 5,307,347 | 4/1994 | Dualt et al. | 370/85.7 |
| 5,331,316 | 7/1994 | Mestdagh et al. | 370/85.7 |

OTHER PUBLICATIONS

"IEEE Standards for Local & Metropolitan Area Networks—Integrated Services (IS) LAN: IEEE 802.9 Isochronous services with Carrier sense multiple access with collison detection (CSMA/CD) Media access control (MAC) service;" IEEE 802.9a Draft Standard P.802.9a/D3, Jan. 16, 1994; by IEEE 802.9a Editor; IEEE Standards Department, Copyright and Permissions, 445 Hoes Lane, P.O. Box 1331, Piscataway, NJ 08855–1331, USA.

*Primary Examiner*—Benedict V. Safourek
*Attorney, Agent, or Firm*—Steven R. Bartholomew

[57] ABSTRACT

Communications systems and methods are directed to a novel communications platform which employs a TDM bus, a TDM bus controller, a passive Ethernet bus, and a centralized Ethernet hub to provide for the communication of data, voice, and/or video signals among a plurality of endpoint devices. The TDM bus controller provides a plurality of B-Channels on the TDM bus. The centralized Ethernet hub is coupled to the TDM bus controller via a control link. Each endpoint device is connected to at least one of the passive Ethernet bus and the TDM bus. The centralized Ethernet hub operates over the passive Ethernet bus to dynamically allocate one or more individual B-Channels of a single B-Channel set amongst a group of endpoint devices, such as telephone equipment, video communications equipment, processors, and/or computing devices. The centralized Ethernet hub provides a logical control channel to each endpoint device for call establishment. Each endpoint device is coupled to the logical control channel over at least one of a first path comprising the passive Ethernet bus and a second path comprising the TDM bus, the TDM bus controller, and the control link. The logical control channel executes B-channel seizure algorithms for establishment of communications to and from selected endpoint devices.

18 Claims, 4 Drawing Sheets

COMMUNICATION SYSTEM TOPOLOGY PROVIDING DYNAMIC ALLOCATION OF B-CHANNELS

FIELD OF THE INVENTION

This invention relates generally to communications systems, and more particularly to a communications platform using an Ethernet hub.

BACKGROUND OF THE INVENTION

Recently, efforts have been directed towards the development of integrated data, voice, and video communications systems. In response to this demand, a new communications protocol known as Isochronous Ethernet (IsoEthernet) has been proposed by the Institute of Electrical and Electronic Engineers as an addition to IEEE Standard 802.9. IsoEthernet is a scheme for multiplexing the combination of a conventional Ethernet channel of approximately 10 Mb/sec and 96 conventional B-channels onto a single standard wire pair in each direction. One end of the wire pair terminates in a "serving closet", which is used to provide an interface between the wire pair and a plurality of user devices such as computers, processors, and/or telephone equipment. An interface is required for the purpose of directing incoming signals on a first wire pair to the appropriate user device, and also for transforming outgoing signals produced by user devices into signals which are to be transmitted on a second wire pair.

One feature common to current state-of-the-art IsoEthernet systems is that these systems are directed to providing separate treatment for Ethernet channels and B-channels. For example, an Ethernet channel may be separated from a B-Channel set by a demultiplexer and directed to a standard Ethernet multiport repeater or a local area network (LAN) switch. These repeaters may be conceptualized as active electrical terminal blocks which connect various ports together into a single shared bandwidth media of 10 Mb/sec. Ethernet repeaters and LAN switches are currently used in a wide variety of LAN applications, but these devices are not traditionally used to switch real-time voice and video signals. These real-time signals, carried by B-Channels, are handled in accordance with standard telephony practices. For example, the B-channels are typically configured in a TDM (time-division multiplex) arrangement, and may be used to provide dedicated service to a plurality of voice or video real-time communications devices. The B-Channels are switched using conventional PBX or PBX-like structures. To handle 96 B-Channels, a relatively expensive 6.144 mHz×N (where N=number of ports) switch is utilized in current state-of-the-art systems. PBX structures are arranged to handle a relatively large number of narrow bandwidth channels, and are not the apparatus of choice for implementing local area networks, which typically involve wide-bandwidth data signals communicated during relatively brief time intervals. In the typical ISDN B-Channel scheme, the B-Channel is generally used to carry an FDX 64 kb/s voice circuit. However, the ISDN B-Channels could be used to carry video, data or a combination of voice, video, and data. DS1 is a TDM system having a 1.544 Mb/sec transmission, i.e.. 24 8-bit channels and 24 framing bits. Each channel is 8 kHz×8=64 Kb/sec. All 23 B-Channels of a DS1 signal can be data. i.e., 23×64 Kbits.

FIG. 1 is a block diagram of a prior art communication system 400 topology which provides data and voice/video communications to and from a plurality of endpoint devices using IsoEthernet communication protocols. In the system of FIG. 1, the endpoint devices are provided in the form of work stations 411. Each work station 411 includes telephone equipment 401 and a personal computer 403. The term "telephone" is to include any real-time communications functions such as voice, video, or conference control and data. The telephone equipment 401 included in a specific work station 411 connects to a B-Channel trunk providing a dedicated set of 96 B-Channels. In this manner, each work station 411 is provided with a separate, dedicated B-Channel trunk, such as a first set of 96 B-Channels 402, a second set of 96 B-Channels 405, or a third set of 96 B-Channels 408.

The first set of 96 B-Channels 402 is coupled to a multiplexer/demultiplexer (MUX/DEMUX) 447. Similarly, the second set of 96 B-Channels 405 and the third set of 96 B-Channels are each coupled to corresponding MUX/DEMUX 447. Each MUX/DEMUX 447 combines a set of 96 B-Channels with a 10 Mb/sec Ethernet channel. For example, the first set of 96 B-Channels 402 is combined with Ethernet Channel 404, the second set of 96 B-Channels 405 is combined with Ethernet Channel 407, and the third set of 96 B-Channels 408 is combined with Ethernet Channel 410. Each MUX/DEMUX 447 combines an Ethernet channel and a set of 96 B-Channels to provide a 16 Mb/sec IsoEthernet channel 409 from the work station to the serving closet. The same (symmetric) function is also provided from the closet to the work station.

The IsoEthernet channels 409 are routed to a serving closet 475, which may be situated in a remote location with respect to work stations 411. At the serving closet 475, a demultiplexer (MUX/DEMUX) 477 is applied to each 16 Mb/sec IsoEthernet channel 409 to separate the IsoEthernet channel 409 into a 10 Mb/sec Ethernet channel and a B-Channel set of 96 B-Channels. The 10 Mb/sec Ethernet channels are routed to an Ethernet hub 415, and the B-Channel sets are routed to a TDM bus 423. The Ethernet hub may typically be a classical multiport repeater or a LAN switch. TDM bus 423 is controlled by a TDM system controller 417 which implements time-division multiplexing.

The operational speed of TDM system controller 417 is determined by the number of work stations 411 and/or quantity of telephone equipment 401 utilized in a given communications system. For example, in the system of FIG. 1, three work stations 411 are shown, each requiring a dedicated set of 96 B-Channels. Each set of B-Channels operates at approximately 6 Mb/sec, and the TDM system controller 417 must be equipped to switch three sets of B-Channels. Therefore, the TDM system controller 417 must have a switching speed of 18 Mb/sec. If twelve work stations 411 were present, the required switching speed would be 72 Mb/sec. Using current state-of-the-art technology, a 72-mHz switch is significantly more costly than an otherwise comparable 6-mHz switch. As the number of work stations 411 is increased, the requirements imposed on the TDM system controller 417 switching speed are increased proportionally. Therefore, systems employing a moderate to high number of work stations 411 may be rendered expensive and/or infeasible. It would be desirable to have a system topology where work stations 411 may be added to the system without having to increase the operational speed of TDM system controller 417.

The TDM system controller 417 is coupled to a digital trunk interface module 419 which interfaces the TDM system controller 417 with a conventional telephone system switch 449. The digital trunk interface module 419 communicates with the conventional telephone system switch 449 using a standard protocol such as PRI (Primary Rate Interface), BRI (Basic Rate Interface), T1, E1, DS3, or the like. Each personal computer 403 is connected to a corresponding Ethernet channel, such as Ethernet channel 404. Ethernet channel 407, or Ethernet channel 410. Each Ethernet channel 404, 407, 410 is routed to a corresponding MUX/DEMUX 447.

Existing IsoEthernet system topology is not especially well-suited to the needs of certain users. Small businesses generally have no need for 96 dedicated real-time B-Channels per user, and it is even quite unlikely that an entire small business will require a total of 96 B-Channels. With the increasing sophistication of user equipment, it would be desirable to dynamically allocate the B-Channels, based upon the immediate needs of the system users at a given point in time. It would be advantageous to change B-Channel allocation in a given system to adapt to changing system requirements and user demand.

SUMMARY OF THE INVENTION

Communications systems and methods are directed to a novel communications platform which employs a TDM bus, a TDM bus controller, and an Ethernet hub. The Ethernet hub includes a plurality of communication ports and a centralized passive bus controller to provide for the communication of data, voice, and/or video signals among a plurality of endpoint devices. The TDM bus controller provides a plurality of B-Channels on the TDM bus. The centralized passive bus controller is coupled to the TDM bus controller via a control link. Each endpoint device is connected to at least one of the Ethernet hub communication ports and the TDM bus. The Ethernet hub dynamically allocates one or more individual B-Channels of a single B-Channel set amongst a group of endpoint devices, such as telephone equipment, video communications equipment, processors, and/or computing devices. The centralized Ethernet hub provides a logical control channel to each endpoint device for call establishment. Each endpoint device is coupled to the logical control channel over at least one of a first path comprising the Ethernet hub and a second path comprising the TDM bus, the TDM bus controller, and the control link. The logical control channel executes B-channel seizure algorithms for establishment of communications to and from selected endpoint devices.

DETAILED DESCRIPTION

Figure 2:
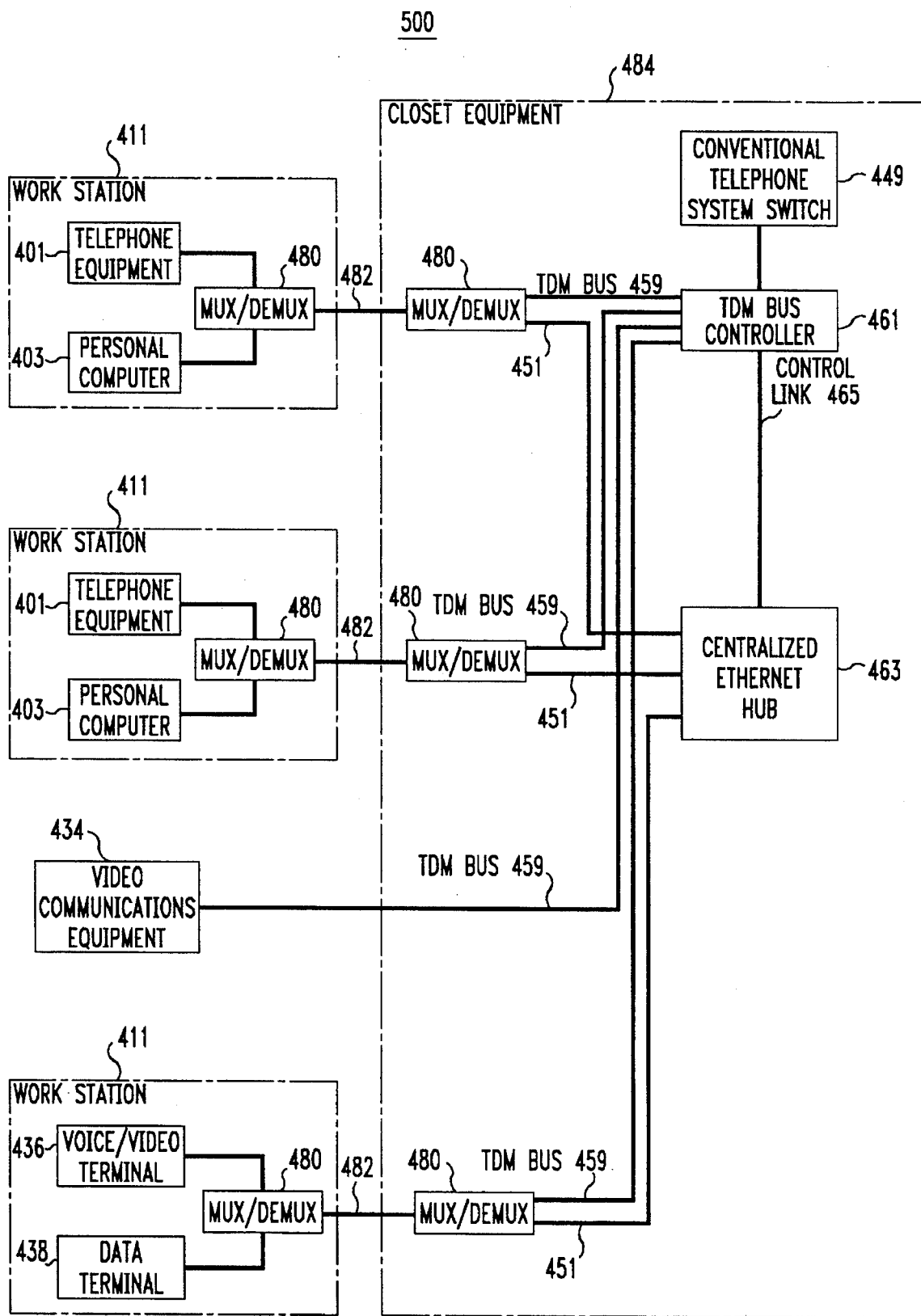
FIG. 2 is a block diagram showing the novel communications platform of the present invention.

FIG. 2 illustrates a novel communications system 500 which provides for the communication of data, voice and/or video signals among a plurality of endpoint devices such as telephone equipment 401, personal computer 403, video communications equipment 434, voice/video terminal 436, data terminal 438, or the like. The communications system 500 includes a TDM bus 459, a TDM bus controller 461, a passive Ethernet bus 451, and a centralized Ethernet hub 463. The TDM bus controller 461 provides a single B-Channel set, consisting of a plurality of B-Channels, on TDM bus 459. The centralized Ethernet hub 463 is coupled to the TDM bus controller 461 via a control link 465.

Each endpoint device is coupled to at least one of the passive Ethernet bus 451 and the TDM bus 459. The endpoint device may be directly coupled to the TDM bus 459 as in the case of video communications equipment 434. Alternatively, endpoint devices may be coupled to TDM bus 459 and/or Ethernet bus 451 via MUX/DEMUXes 480 and communication links 482, as, for example, where the endpoint device is a work station 411. The centralized Ethernet hub 463 operates over the passive Ethernet bus 451 to dynamically allocate one or more individual B-Channels of the single B-Channel set amongst a group of endpoint devices. The centralized Ethernet hub 463 provides a logical control channel originating from the TDM bus controller 461 and terminating at each endpoint device for call establishment. Each endpoint device is coupled to the logical control channel over at least one of a first path comprising the passive Ethernet bus 451 and a second path comprising the TDM bus 459, the TDM bus controller 461, and the control link 465. The logical control channel executes B-channel seizure algorithms for establishment of communications to and from selected endpoint devices. In this manner, a single set of B-Channels is dynamically allocated amongst a group of endpoint devices such as telephone equipment 401, personal computer 403, video communications equipment 434, voice/video terminal 436, and data terminal 438.

The endpoint devices may be arranged to provide one or more work stations 411. A typical work station 411 may include, for example, telephone equipment 401 and personal computer 403. Passive Ethernet bus 451 may be a conventional passive 10 Mb/sec Ethernet bus. TDM bus controller 461 may be a conventional time division multiplexer operating, for example, at 6 Mb/sec to provide a shared set of 96 standard B-Channels. In this manner, 96 such B-Channels comprise a set. However, this example is presented for purposes of illustration, to match that set forth under the IsoEthernet draft standard, inasmuch as a set of B-Channels may be configured to contain any convenient number of B-Channels to meet the needs of specific system applications. If desired, TDM bus controller 461 can be configured to provide an optional D-Channel. Conventional devices are utilized to provide control link 465 and TDM bus 459. The structure and function of these devices are well-known to those skilled in the art.

Centralized Ethernet hub 463 provides timing and/or synchronization information to the TDM bus 459 over control link 465, as well as one or more electrical termination loads for the passive Ethernet bus 451. Each passive Ethernet bus 451 terminates on one port of a traditional multiport repeater or LAN switch. The combination of TDM bus controller 461, control link 465, and centralized Ethernet hub 463 is conceptualized as being a hybrid Ethernet repeater which provides the logical equivalent of a passive bus for the plurality of communications trunks, such as the TDM bus 459, for connection to endpoint devices such as work station 411, telephone equipment 401, video communications equipment 434, and/or personal computer 403. Work station 411 may include a voice/video terminal 436 and a data terminal 438. The data terminal 438 is equipped to operate over an Ethernet communications channel of 10 Mb/sec, and the voice/video terminal 436 operates using a real-time communications channel consisting of some number of B-Channels, typically 2, 6, or 24. Centralized Ethernet hub 463, TDM bus controller 461, conventional telephone system switch 449, and one or more MUX/DEMUXes 480 may be collectively referred to as closet equipment 484.

Each endpoint device connected to TDM bus 459 is equipped to capture any of the 96 B-Channels, and these channels are shared among the various endpoint devices. Control software is distributed amongst the endpoint devices to provide an endpoint-to-endpoint communications structure that does not requires traditional telephony switching elements. This control software is transmitted from one or more endpoint devices to centralized Ethernet hub 463 over passive Ethernet bus 451, to the TDM bus controller 461 via control link 465 where the software is utilized to provide the logical control channel referred to previously. Alternatively, all or a portion of the control software may reside in the TDM bus controller 461.

The control software executed by TDM bus controller 461 implements selective, dynamic allocation of the B-Channels to enable communications system 500 to adapt to changing user needs. Selective, dynamic channel allocation means that at least some of the B-Channels are not dedicated to one or more specific uses. These B-Channels are shared amongst the endpoint devices, based upon demand resulting from the endpoint devices in use at a particular point in time. As new devices are activated, B-Channels may be allocated away from devices presently in use. If a device presently in use is deactivated, the B-Channels occupied by this device may be reallocated to one or more devices that continue to communicate over the TDM bus 459 and/or the passive Ethernet bus 451.

One example of selective, dynamic B-Channel allocation is in the operational environment of a small business having 10 work stations. In this business, it is expected that no more than four video telephone calls will be under way at any given time. Each video call requires a communications channel providing a data rate of 384 Kb/sec to provide a video image of satisfactory quality. This data rate may be provided using 6 B-Channels, where each B-Channel provides a data rate of 64 Kb/sec. To provide the business with four video communications channels, 24 B-Channels are required.

In the above example, assume that only two video telephones are in use at a given time, and no other endpoint devices are in operation. If each video telephone was assigned a fixed block of 6 B-Channels, two of the B-Channel blocks would be occupied by video data, and the two remaining B-Channel blocks would be vacant and unused. However, the two vacant B-Channels can be reassigned to the two video telephones in use. If one vacant B-Channel block is assigned to each of these video telephones, the data rate of video image transmission is doubled to 768 Kb/sec, providing higher-quality video images. If one of the video telephones is communicating higher-priority information than the other telephone, the two vacant channels could both be assigned to the higher-priority telephone to triple the available data rate on this telephone to 1152 Kb/sec. The capability of allocating the B-Channels to meet the needs of specific situations and system requirements may be referred to as selective, dynamic channel allocation. This function is performed using software stored in and executed by one or more endpoint devices in conjunction with software executed within the TDM bus controller 461. This software is generally available and known to those skilled in the art.

Figure 1:
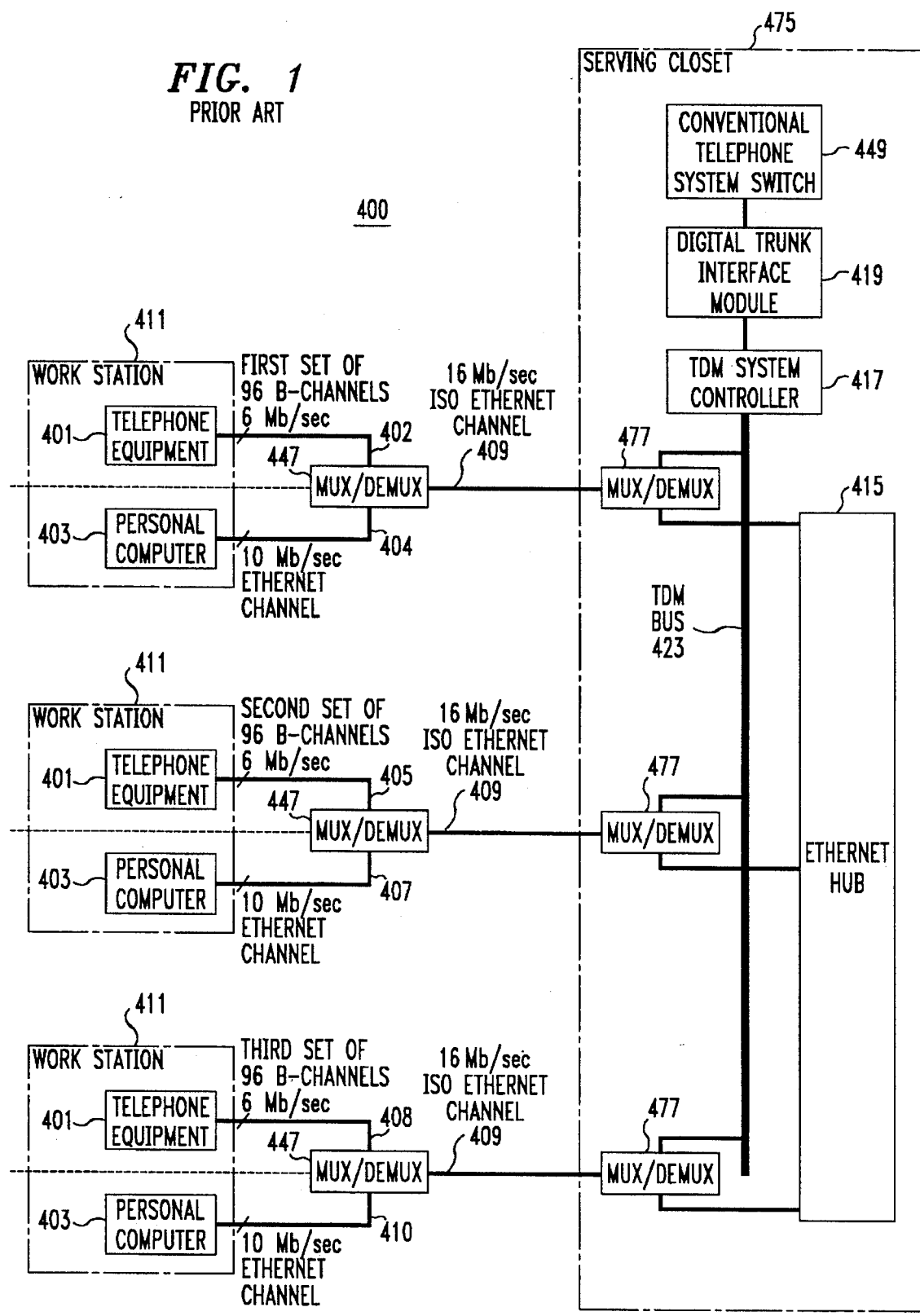
FIG. 1 is a block diagram of a prior art communication system topology which provides data and voice/video communications to and from a plurality of endpoint devices using IsoEthernet communication protocols.

The system of FIG. 2 is advantageous over the prior art system shown in FIG. 1, in that a simpler, less expensive TDM bus controller may be employed in the system of FIG. 2. For example, assume that it is desired to provide a communications system linking together eight endpoint devices. The endpoint devices are conventional voice telephones. The TDM system controller 417 of FIG. 1 must provide eight sets of 96 B-Channels, one set for each telephone. Thus, the TDM system controller 417 must be capable of operating at a speed of [6 Mb/sec (one set of B-channels)*8 (number of B-Channel sets to be provided)], or 48 Mb/sec. The cost of a 48 Mb/sec TDM system controller 417 (which contains 48 mHz switching devices) is relatively high. Using the system topology shown in FIG. 2, the eight voice telephones discussed in the example described above would share a common B-Channel set. The TDM bus controller 461 would thus be required to operate at a relatively low speed of 6 Mb/sec, a significant cost savings over a 48 Mb/sec TDM system controller 417.

Figure 3:
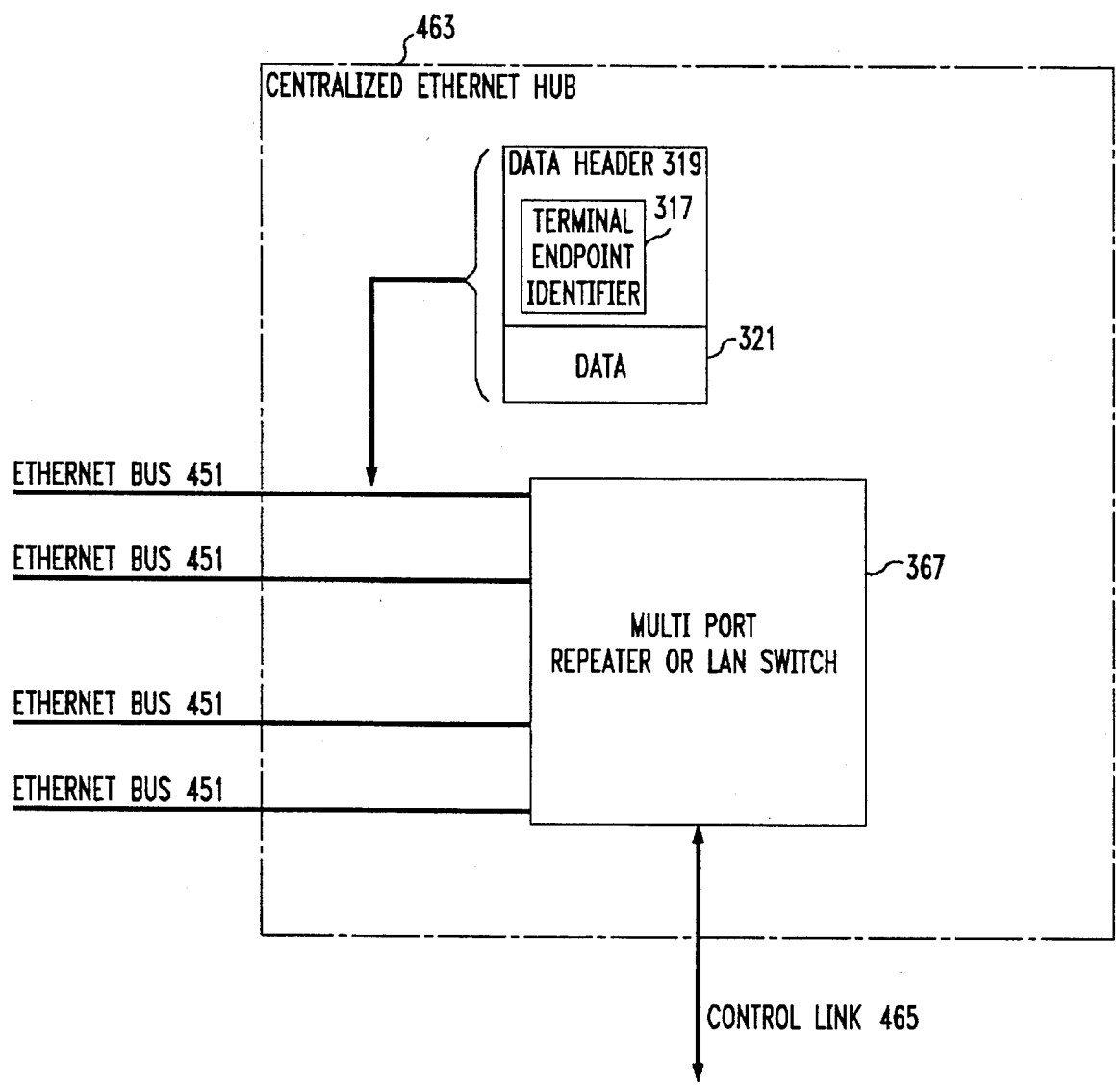
FIG. 3 is a hardware block diagram setting forth the structure of the centralized Ethernet hub shown in FIG. 2.

With reference to FIG. 3, a hardware block diagram of the centralized Ethernet hub 463 of FIG. 2 is shown. The centralized Ethernet hub 463 (FIG. 3) provides for electronic communication over an Ethernet bus 451 using a traditional Ethernet multiport repeater or LAN switch 367. These multiport repeaters and LAN switches are well-known to those skilled in the art. Multiport repeater or LAN switch 463 generally includes a control link 465 port which controls the switching functions of the multiport repeater or LAN switch. Ethernet endpoint devices may or may not be equipped to communicate over B-Channels and/or D-Channels.

The signals communicated over passive Ethernet bus 451 (FIG. 3) utilize a data structure consisting of a data header 319 followed by data 321. The data header 319 includes a terminal endpoint identifier (TID) 317 which uniquely identifies a specific endpoint device and/or a certain category of endpoint device such as voice telephone, personal computer, etc. The information within the TID 317 portion of the data header 319, as well as the general use of TIDs, is well-known to those skilled in the art.

Figure 4:
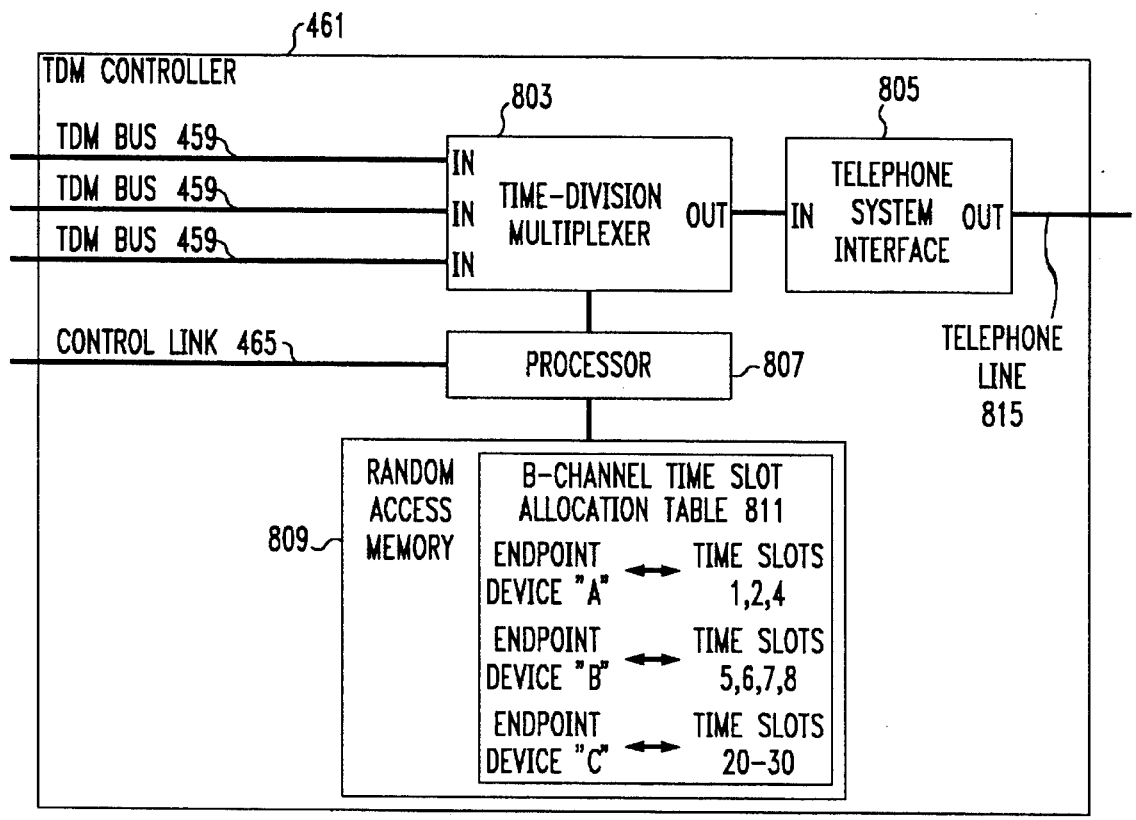
FIG. 4 is a hardware block diagram setting forth the structure of the TDM bus controller shown in FIG. 2.

FIG. 4 is a detailed hardware block diagram of the TDM bus controller 461 shown in FIG. 2. Referring now to FIG. 4, TDM bus 459 is coupled to a time-division multiplexer 803 adapted to provide a plurality of bandwidth-limited communication channels in a time-division multiplexed arrangement. In the present example, time-division multiplexer 803 provides 96 standard B-Channels occupying a total bandwidth of 6 Mb/sec. One or more of these communication channels may be interfaced with a conventional telephone line 815 using a telephone system interface 805. Telephone system interface 805 converts the conventional TDM signals produced by time-division multiplexer 803 into a form suitable for transmission over one or more standard tip/ring telephone lines.

Time-division multiplexer 803 is controlled by a processor 807 which may be a commonly-available microprocessor device of a type well-known to those skilled in the art. The processor 807 interfaces with centralized Ethernet hub 463 (FIG. 3) over control link 465 (FIG. 4). Processor 807 is coupled to a standard random-access memory (RAM) 809 device. A B-Channel Time Slot Allocation Table 811 is stored in RAM 809. Allocation Table 811 associates a list of endpoint devices with corresponding time slots. Each time slot specifies one or more communication channels provided by time-division multiplexer 803. For example, endpoint device "A" is associated with time slots 1, 2, and 4. Time slots 1, 2, and 4 may correspond to B-Channels 1, 2, and 4 of a single B-Channel set of 96 B-Channels.

Figure 5:
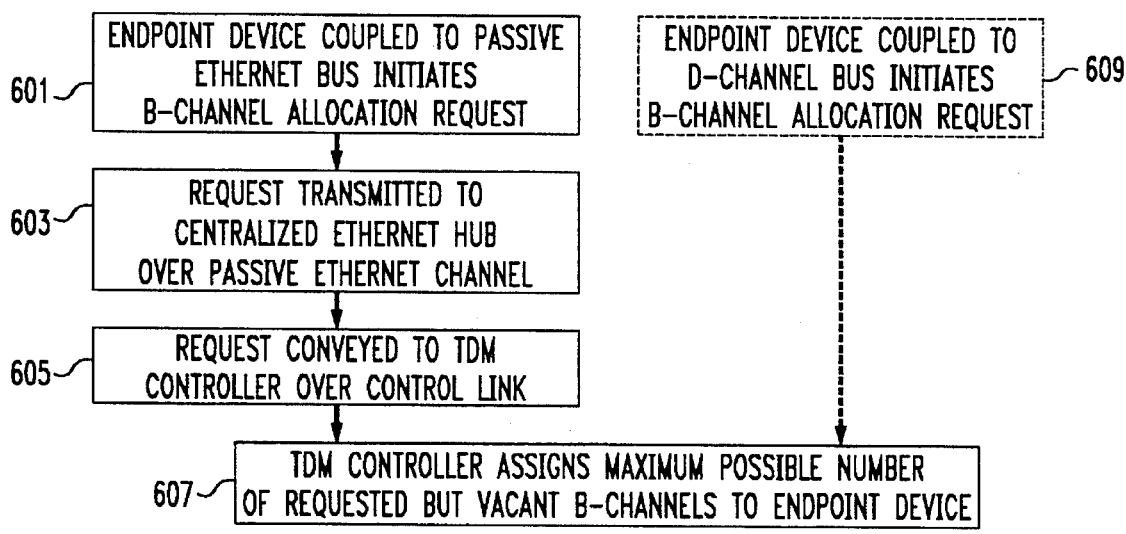
FIG. 5 is a flowchart setting forth the sequence of operations implemented by the system of FIG. 2 when an endpoint device initiates a communications link according to a first embodiment disclosed herein.

FIG. 5 is a flowchart setting forth the operational sequence which commences at the time a first endpoint device seeks to establish a new communications link with a second endpoint device. At block 601, an endpoint device coupled to the passive Ethernet bus initiates a B-Channel request. The request is transmitted to the centralized Ethernet hub 463 over the passive Ethernet channel (block 603). At block 605, the request is conveyed to the TDM bus controller over control link 465 (FIG. 4). In response to the request, the TDM bus controller assigns the maximum possible number of requested but vacant (unoccupied) B-Channels to the endpoint device (FIG. 5, block 607).

FIG. 5 also describes the operational sequence implemented when an endpoint device coupled to the TDM bus seeks to initiate communications. Operations commence at block 609, at which point the endpoint device initiates a B-Channel allocation request over a standard D-Channel provided by TDM bus controller 461 (FIG. 2). In response to the allocation request, the TDM bus controller assigns the maximum possible number of requested but vacant (unoccupied) B-Channels to the endpoint device (FIG. 5, block 607).

What is claimed is:

1. A centralized Ethernet hub being adapted for use in a communications system including:
   (i) a TDM bus adapted for connection to one or more endpoint devices;
   (ii) a TDM bus controller for providing a set of B-Channels comprised of a plurality of time-division multiplexed B-Channels on the TDM bus;
   (iii) a passive bus for providing access to the set of B-Channels; and
   (iv) a plurality of endpoint devices, each endpoint device including channel allocation request means coupled to at least one of the passive bus and the TDM bus for requesting one or more B-Channels from the set of B-Channels;

characterized in that the Ethernet hub provides:
   (a) a control link for coupling the centralized Ethernet hub to the TDM bus controller;
   (b) a plurality of Ethernet communication channels; and
   (c) channel allocation means responsive to the channel allocation request means of an endpoint device to allocate one or more individual B-Channels of a single B-Channel set amongst a plurality of endpoint devices.

2. A centralized Ethernet hub as set forth in claim 1 wherein the endpoint devices are telephone equipment, video communications equipment, processors, and/or computing devices.

3. A centralized Ethernet hub as set forth in claim 1 further including logical control channel means for providing a logical control channel to each endpoint device for establishment of communications, each endpoint device being coupled to the logical control channel means over at least one of a first path comprising the passive bus and a second path comprising the TDM bus, the TDM bus controller, and the control link; the logical control channel means adapted to execute B-Channel seizure algorithms for establishment of communications to and from selected endpoint devices.

4. A communications system comprising:
   (a) a TDM bus controller for providing a set of B-Channels comprised of a plurality of time-division multiplexed B-Channels on a TDM bus;
   (b) a centralized Ethernet hub for providing a plurality of Ethernet communication channels; the Ethernet hub including channel allocation means responsive to a channel allocation request means of an endpoint device to allocate one or more individual B-Channels of the B-Channel set amongst a plurality of endpoint devices, and a centralized passive bus controller for controlling electronic communication on a passive Ethernet bus; and
   (c) a control link for coupling the centralized passive bus controller to the TDM bus controller;

the communications system adapted for use in conjunction with:
   (i) an existing TDM bus adapted for connection to one or more endpoint devices;
   (ii) an existing passive Ethernet bus adapted for connection to one or more endpoint devices, and
   (iii) an existing plurality of endpoint devices, each endpoint device including channel allocation request means coupled to at least one of the passive Ethernet bus and the TDM bus for requesting one or more B-Channels from the set of B-Channels.

5. A communications system as set forth in claim 4 further including a plurality of endpoint devices, wherein the endpoint devices telephone equipment, video communications equipment, processors, and/or computing devices.

6. A communications system as set forth in claim 5 wherein the centralized passive bus controller further includes logical control channel means for providing a logical control channel to each endpoint device for establishment of communications, each endpoint device being coupled to the logical control channel means over at least one of a first path comprising the passive Ethernet bus and a second path comprising the TDM bus, the TDM bus controller, and the control link; the logical control channel means adapted to execute B-Channel seizure algorithms for establishment of communications to and from selected endpoint devices.

7. A communications system comprising:
   (a) a TDM bus adapted for connection to one or more endpoint devices;
   (b) a TDM bus controller for providing a set of B-Channels comprised of a plurality of time-division multiplexed B-Channels on the TDM bus;
   (c) a passive Ethernet bus adapted for connection to one or more endpoint devices;
   (d) a centralized Ethernet hub for providing a plurality of Ethernet communication channels; and
   (e) a control link for coupling the centralized Ethernet hub to the TDM bus controller;

the centralized Ethernet hub including channel allocation means responsive to a channel allocation request means of the endpoint devices to allocate one or more individual B-Channels of a single B-Channel set amongst the plurality of endpoint devices; the communications system adapted for use in conjunction with a plurality of endpoint devices, each endpoint device including channel allocation request means coupled to at least one of the passive Ethernet bus and the TDM bus for requesting one or more B-Channels from the set of B-Channels.

8. A communications system as set forth in claim 7, further including a plurality of endpoint devices, wherein the endpoint devices are telephone equipment, video communications equipment, processors, and/or computing devices.

9. A communications system as set forth in claim 7, wherein the centralized Ethernet hub further includes logical control channel means for providing a logical control channel to each endpoint device for establishment of communications, each endpoint device being coupled to the logical control channel means over at least one of a first path comprising the passive Ethernet bus and a second path comprising the TDM bus, the TDM bus controller, and the control link; the logical control channel means adapted to execute B-channel seizure algorithms for establishment of communications to and from selected endpoint devices.

10. A communications system comprising:
    (a) a TDM bus adapted for connection to one or more endpoint devices;
    (b) time-division multiplex controller means for providing a plurality of time-division multiplexed B-Channels on the TDM bus;
    (c) centralized Ethernet hub means for providing a plurality of Ethernet communications channels;
    (d) a control link coupling the centralized Ethernet hub means to the TDM bus controller means; and
    (e) a B-channel bus for providing a plurality of time-division-multiplexed B-channels;
    the Ethernet hub, the TDM bus, the centralized Ethernet hub means, the control link, and the time-division multiplex controller means together comprising dynamic B-Channel allocation means for allocating a single B-Channel set consisting of a plurality of B-Channels among a plurality of endpoint devices such that the B-Channel set is shared among the plurality of endpoint devices; the dynamic B-Channel allocation means being coupled to the B-Channel bus and capturing selected ones of said B-Channels in response to the channel allocation request means of an endpoint device for establishing a communications link between a plurality of endpoint devices; the communications system adapted for use in conjunction with a plurality of endpoint devices, each endpoint device being adapted for connection to any of the Ethernet hub and the TDM bus; at least one endpoint device including channel allocation request means coupled to the Ethernet hub for establishing a communications link between a plurality of endpoint devices.

11. A communications system as set forth in claim 10 wherein the B-Channel set includes a number of B-Channels in the range of 48–192, inclusive.

12. A communications system as set forth in claim 11 wherein each B-Channel set includes 96 B-Channels.

13. The communications system of claim 10 wherein the channel allocation means includes control software distributed amongst a plurality of endpoint devices to provide an endpoint device to endpoint device communications structure that does not require logical switching means connected between endpoint devices.

14. The communications system of claim 10 wherein the communications hub means further includes Ethernet repeater means for providing a dedicated logical control channel on the communications trunk means for establishing communications with at least one endpoint device, such that the logical control channel executes channel seizure algorithms for establishment of communications to and from selected endpoint devices.

15. A communications system comprising:
    (a) a TDM bus;
    (b) a TDM bus controller for providing a set of B-Channels comprised of a plurality of time-division multiplexed B-Channels on the TDM bus;
    (c) a passive Ethernet bus;
    (d) a centralized Ethernet hub for providing a plurality of Ethernet communication channels on the passive Ethernet bus;
    (e) a plurality of endpoint devices, each endpoint device including channel allocation request means coupled to at least one of the passive Ethernet bus and the TDM bus for requesting one or more B-Channels from the set of B-Channels; and
    (f) a control link for coupling the centralized Ethernet hub to the TDM bus controller;
    the centralized Ethernet hub including channel allocation means responsive to the channel allocation request means of the endpoint devices to allocate one or more individual B-Channels of a single B-Channel set amongst the plurality of endpoint devices.

16. A communications system comprising:
    (a) a TDM bus;
    (b) a passive Ethernet bus;
    (c) a plurality of endpoint devices, each endpoint device being adapted for connection to any of the TDM bus and the passive Ethernet bus, at least one endpoint device including channel allocation request means coupled to the Ethernet bus for establishing a communications link between a plurality of endpoint devices;
    (d) time-division multiplex controller means for providing a plurality of time-division multiplexed B-Channels on the TDM bus;
    (e) centralized Ethernet hub means for providing a plurality of Ethernet communications channels on the Ethernet bus; and
    (f) a control link coupling the centralized Ethernet hub means to the TDM bus controller means;
    the TDM bus, the centralized Ethernet hub means, the control link, and the time-division multiplex controller means together comprising dynamic B-Channel allocation means for allocating a single B-Channel set consisting of a plurality of B-Channels among a plurality of endpoint devices such that the B-Channel set is shared among the plurality of endpoint devices; the dynamic B-Channel allocation means being coupled to the B-Channel bus and capturing selected ones of said B-Channels in response to the channel allocation request means of an endpoint device for establishing a communications link between a plurality of endpoint devices.

17. The communications system of claim 16 wherein the channel allocation means includes control software distributed amongst a plurality of endpoint devices to provide an endpoint device to endpoint device communications structure that does not require logical switching means connected between endpoint devices.

18. The communications system of claim 16 wherein the communications hub means further includes Ethernet repeater means for providing a dedicated logical control channel on the communications trunk means for establishing communications with at least one endpoint device, such that the logical control channel executes channel seizure algorithms for establishment of communications to and from selected endpoint devices.

* * * * *